April 12, 1960
H. E. HALE
2,932,213
PUSH BUTTON ACTUATING MECHANISM
Filed Jan. 31, 1956
5 Sheets-Sheet 1
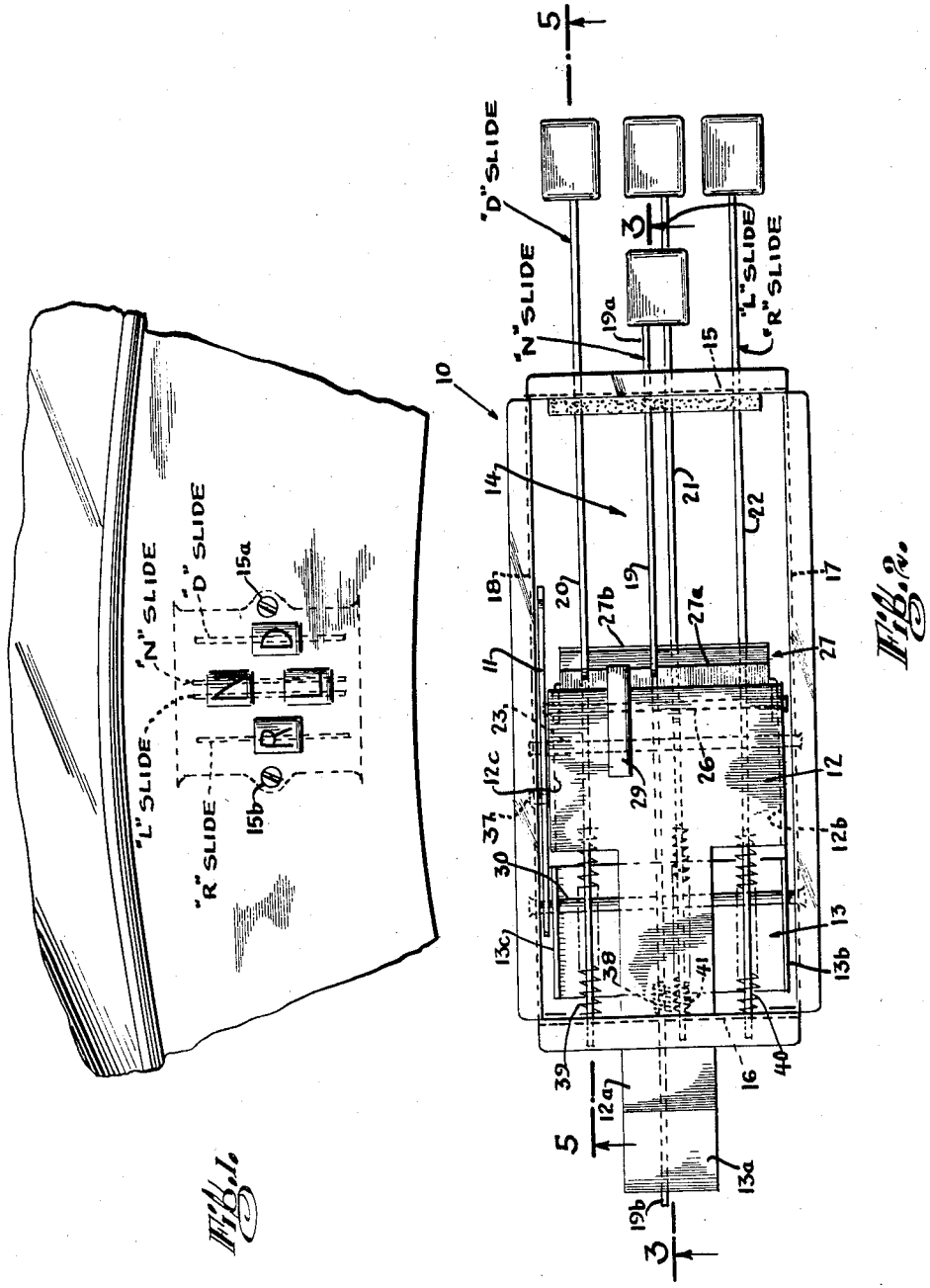
INVENTOR
HAYDEN E. HALE
BY
Kenyon & Kenyon
ATTORNEYS

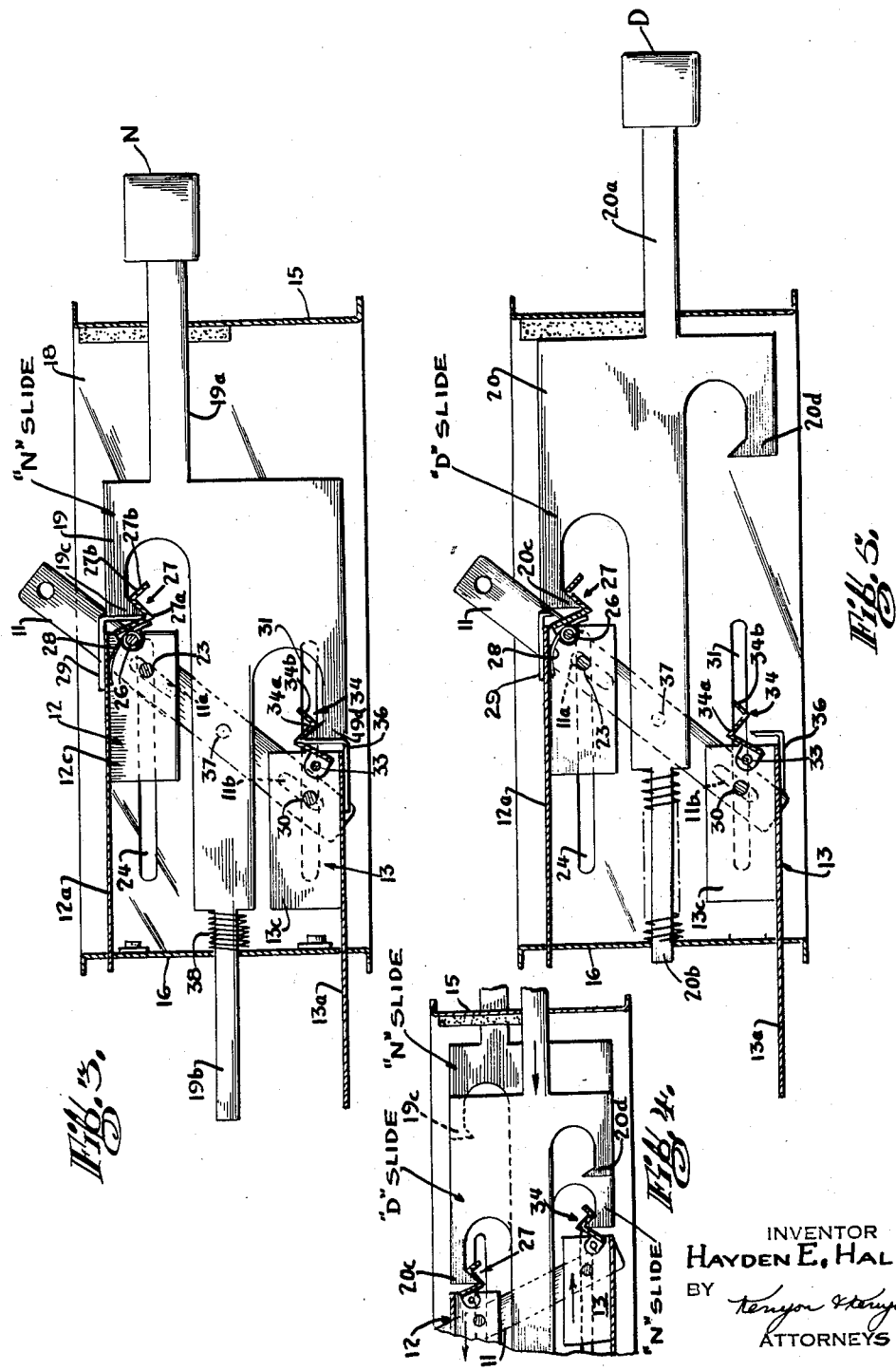

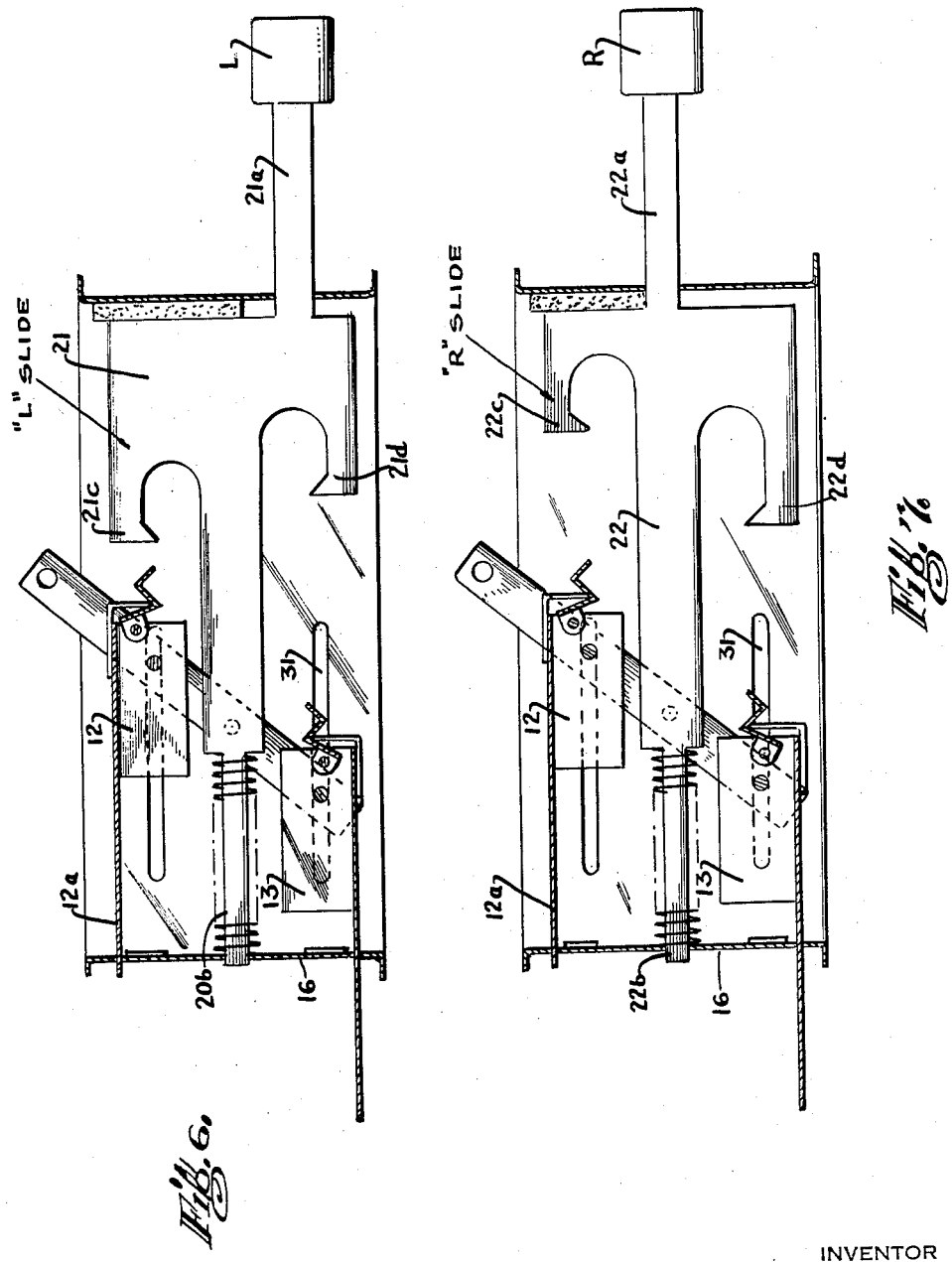

April 12, 1960  H. E. HALE  2,932,213
PUSH BUTTON ACTUATING MECHANISM
Filed Jan. 31, 1956  5 Sheets-Sheet 4
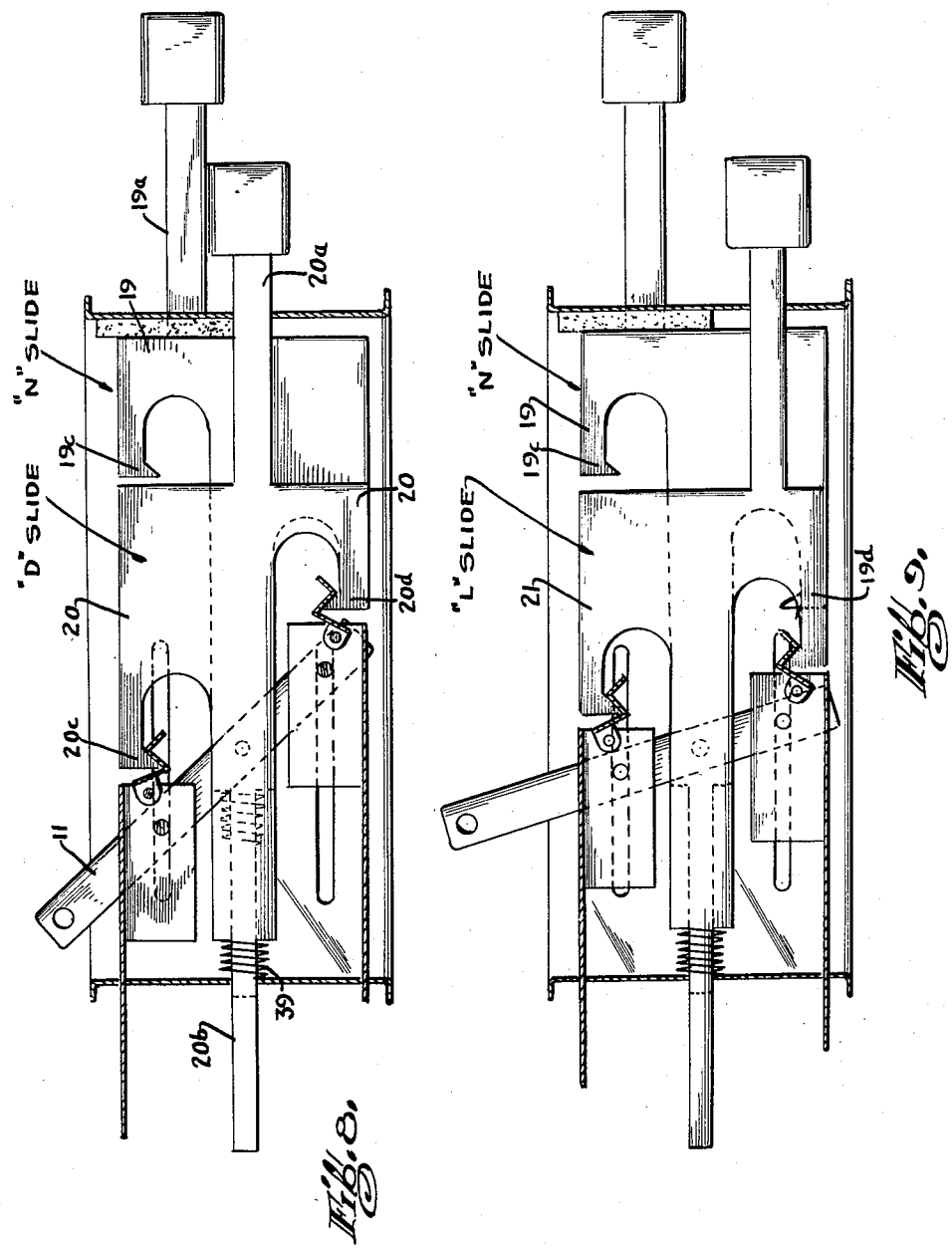
INVENTOR
HAYDEN E. HALE
BY
ATTORNEYS

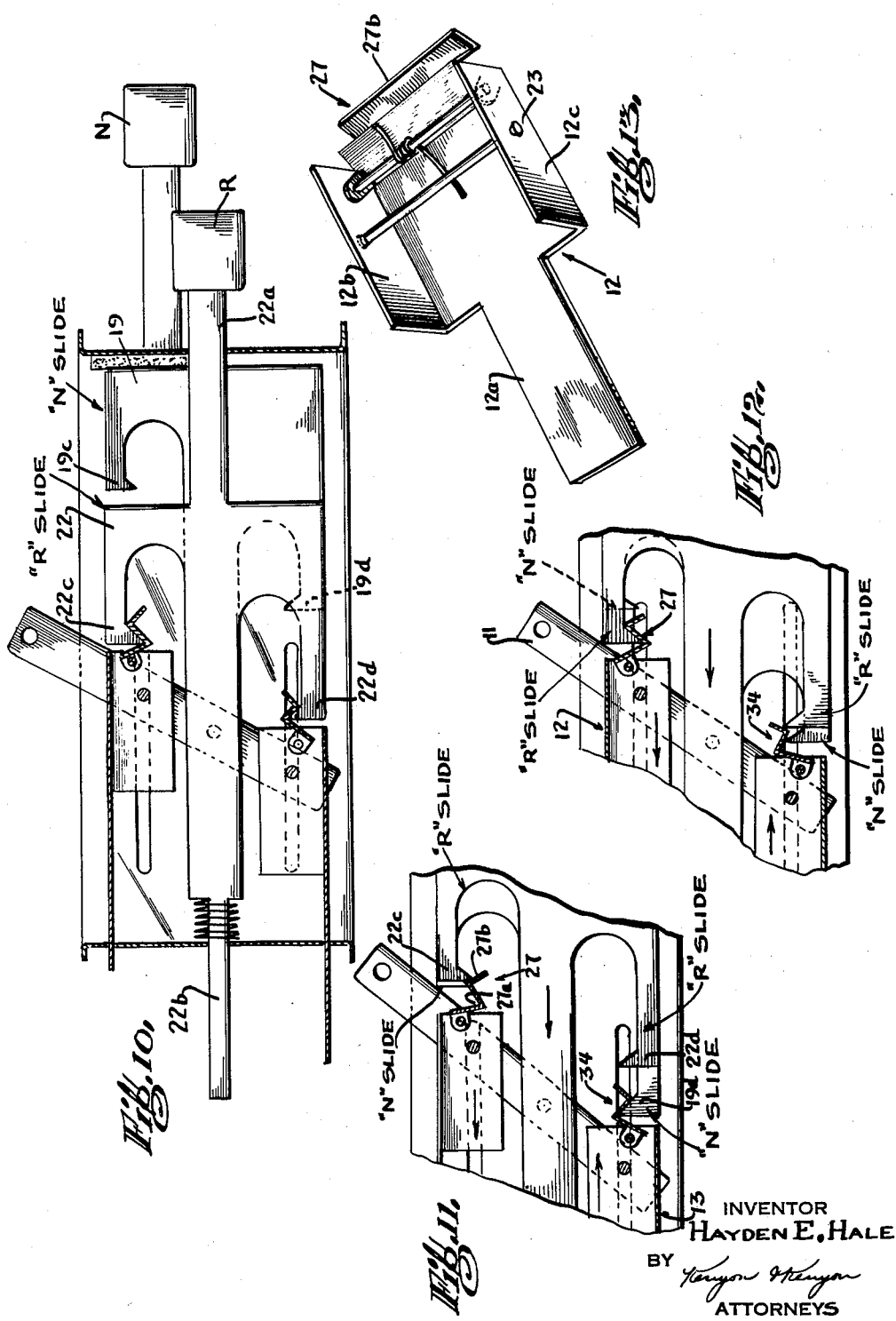

United States Patent Office 2,932,213
Patented Apr. 12, 1960

2,932,213

PUSH BUTTON ACTUATING MECHANISM

Hayden E. Hale, Kalamazoo, Mich., assignor to Shakespeare Products Company, Kalamazoo, Mich., a corporation of Michigan Application January 31, 1956, Serial No. 562,495

7 Claims. (Cl. 74—479)

The present invention relates generally to selective actuating mechanisms and more particularly to a push button drive selector for controlling the power transmission system of an automobile.

In the conventional automotive transmission system, a manually-operated shift lever is employed which functions to shift the transmission gears from a neutral position to other positions providing forward and reverse speeds, as desired. In recent years automatic transmission or torque conversion systems have been developed in conjunction with push button devices which act to select the desired driving range, thereby eliminating altogether the need for a manual shift lever. With such devices the operation of the vehicle is greatly simplified and the driver has merely to actuate an appropriate button in order to put the vehicle in low gear, reverse, neutral or in automatic drive operation, as desired.

Experience has shown, however, that existing push button selector assemblies possess certain drawbacks which give rise to serious hazards in car operation. These dangers stem from the fact that it is entirely possible for the transmission system to be engaged in a given range and yet for all of the push buttons to be out. Consequently the push button panel affords no indication as to the status of the transmission system and one starting the automobile on the assumption that the system is in neutral, may find himself without warning in reverse or moving forward. Obviously, such unpredictable operation may lead to major accidents.

With existing assemblies, when one button is fully depressed to carry out a desired operation, say reverse, the button is locked in place and the transmission system is engaged. If now a second button, say neutral, is only partially depressed, this partial action will release the previously depressed reverse button without re-engaging the transmission system. If the partially depressed neutral button, rather than being fully depressed to lock in place, is then inadvertently permitted to return to its "out" position, the transmission system will still be engaged in reverse and yet the reverse button is out as well as all the other buttons. Thus no indication is presented as to the status of the transmission system and the driver, not realizing his failure to complete the shift over from reverse to neutral, may find himself suddenly moving in an unintended direction.

In view of the foregoing, it is the primary object of the present invention to overcome the above-described drawbacks of known selector devices and to provide a push button assembly operating on the lock-out principle whereby no button can be released without fully depressing another button.

More specifically, it is an object of this invention to provide a push button drive selector wherein the partial depression of a button does not effect release of a previously engaged button until such time as the second button is fully depressed and engaged. Thus with an assembly in accordance with the invention, the status of the associated transmission system is indicated at all times, thereby precluding the possibility of inadvertent operation.

Also an object of the invention is to provide a selector mechanism wherein the straight line movement of a push button actuator element acts to shift a positionable member to a predetermined angular position which is different for each of the several elements. A significant feature of the invention resides in the fact that the actuator element, when fully depressed, is locked to and engages the positionable member to maintain the desired angular position, and is released only when a second element is fully depressed and engaged.

A further object of the invention is to provide an efficient and reliable button selector mechanism which is mechanically simple in construction, capable of being readily manufactured by mass production techniques. The selector is further characterized by long life under severe operating conditions.

The selector in accordance with the invention is particularly adapted for use in conjunction with automatic transmission systems. However, its use is by no means limited to this application and the selector may be used wherever positive push button control is desired.

For a better understanding of the invention as well as other objects and further features thereof, reference is had to the following detailed description to be read in conjunction with the accompanying drawing, wherein like components in the various views are identified by like reference numerals.

In the drawings:

Figure 1 is a front view of the selector assembly as it appears when mounted on the panel of a vehicle.

Figure 2 is a top plan view of the selector assembly showing the D (drive), N (neutral), L (low) and R (reverse) actuator slide plates, the neutral plate being in its operative position.

Figure 3 is a longitudinal sectional view of the assembly showing only the N plate in its operative position.

Figure 4 is a longitudinal sectional view of the assembly showing both the D and N plates in their relative transition positions as the D plate is being moved forward to effect engagement and the N plate is being driven outwardly to effect release thereof.

Figure 5 is a longitudinal sectional view of the assembly showing only the D plate in its inoperative or release position.

Figure 6 is a longitudinal sectional view of the assembly showing only the L plate therein in its inoperative position.

Figure 7 is a longitudinal sectional view of the assembly showing only the R plate therein in its inoperative position.

Figure 8 is a longitudinal sectional view of the assembly showing the D plate in its operative position and the N plate in its released position.

Figure 9 is a longitudinal sectional view of the assembly showing the L plate in its operative position and the N plate in its released position.

Figure 10 is a longitudinal sectional view of the assembly showing the R plate in its operative position and the N plate in its released position.

Figure 11 is a longitudinal sectional view of the assembly showing the R plate shortly before it assumes its operative position and the N plate shortly prior to its release.

Figure 12 is a longitudinal sectional view of the assembly showing the R plate just prior to engagement and the N plate about to be released.

Figure 13 is a perspective view of one of the carriages.

Referring now to the drawings and more particularly to Figs. 2 and 3, the selective actuator mechanism in accordance with the invention comprises a box-like frame, generally designated by numeral 10, a positionable member including a pinion 11 and top and bottom carriages 12 and 13 pivotally connected to opposite ends of the arm, and a plurality of actuating elements generally designated by numeral 14.

The frame 10 is constituted by four rectangular plates forming a front wall 15, a rear wall 16 and side walls 17 and 18. The side walls are provided with end flanges for connection to the front and rear walls, the walls being bolted together by rivets or screws to form a firm and rigid support. As shown in Fig. 1, the front wall 15 is further provided with oppositely projecting ears 15a and 16b to facilitate mounting of the device on the dashboard of an automobile or on the steering post thereof.

The actuating elements 14 are supported for reciprocal movement within the frame 10 at spaced positions therein parallel to side walls 15 and 16 and are constituted by four actuator slide plates 19, 20, 21 and 22. Each actuator plate, as exemplified by plate 19 in Fig. 3, includes a plunger 19a which extends longitudinally from the front end thereof, and a shank 19b which extends longitudinally from the rear end thereof, the plunger and shank being integral with the actuator plate. Plungers 19a, 20a, 21a and 22a of the several slide plates pass through suitable openings in front wall 15, while shanks 19b, 20b, 21b and 22b pass through suitable openings in rear wall 16.

For manual operation of the actuator plates a push button is attached to the free end of each plunger. The four push buttons are designated by letters R, D, L and N representing the respective operations of reverse, drive, low and neutral. It is to be understood that while the actuator device is described with four actuating elements as it functions to select the proper driving range in an automobile engine, a greater or smaller number of plates may be used, as required, in a given installation. The device is by no means limited to this purpose and may be employed for selective actuation of any mechanism.

The shanks extending from the several actuator plates occupy corresponding positions thereon so that the shank portions projecting from the rear wall are aligned in a common plane. However, the plungers as is evident from Figs. 3 to 10 extend from different points on the front end of the several actuator plates. These points are so arranged that the push buttons N, L, R and D connected to the plungers are disposed at the corners of a diamond as may be seen in Fig. 1. In this way, even though the actuator plates are relatively close to each other, adequate clearance is available between the various push buttons to permit independent operation thereof.

As best seen in Figs. 2 and 3 and separately in Fig. 13, mounted for reciprocal movement within the frame in a plane perpendicular to side walls 17 and 18 and adjacent the upper end thereof is the top carriage 12 which is provided with a rearwardly extending tongue 12a, the carriage having side arms 12b and 12c depending therefrom. Tongue 12a passes through a suitable opening in a rear wall 16, whereas the side arms 12b and 12c lie parallel to the side walls 17 and 18 of the frame.

Interconnecting the side arms 12b and 12c is a cross pin 23 whose extremities project through longitudinally extending slots 24 formed in side walls 17 and 18, only the slot on wall 18 being visible in the figures. Thus the carriage is supported by the extremities of the cross pin and is slidable in either direction within the confines of the slots. The tongue 12a is ejected from the rear wall 16 when carriage 12 is shifted in the direction thereof, the tongue retracting into the frame when the carriage is shifted away from the rear wall. The tongue serves to prevent rotation of the carriage about cross pin 23.

Pivotally mounted on a shaft 26, which interconnects side arms 12b and 12c adjacent the front end thereof, is a latch piece 27 having a sawtoothed form creating a V-shaped notch 27a and an inclined release bar 27b in front of the notch. A helical spring 28 is wound about shaft 26 and has one end extension pressed against the under surface of the carriage and the other end extension pressed against the under surface of the latch piece. Spring 28 acts to urge latch piece 27 upwardly to an extent limited by a stop member 29. Stop member 29 is L-shaped and is provided with a horizontal leg which is connected to the upper surface of the carriage and a vertical leg which is inserted in the notch 27a to restrict upward movement of the latch piece.

Also mounted for reciprocal movement within the frame in a plane perpendicular to side walls 17 and 18 and adjacent the lower end thereof, is the bottom carriage 13 which is provided with a rearwardly extending tongue 13a passing through a suitable opening in rear wall 16. Carriage 13 also includes upwardly extending side arms 13b and 13c, parallel to the side walls 17 and 18. Interconnecting arms 13b and 13c of the carriage is a cross pin 30 whose extremities project through longitudinally extending slots 31 and 32 formed in side walls 17 and 18. The lower slots 31 in the side walls are aligned with the upper slots 24 whereby the bottom carriage 13 is slidable within longitudinal limits identical to that of top carriage 18.

Pivotally mounted on a shaft 33 and interconnecting side arms 13b and 13c and adjacent the front end thereof is a latch piece 34 having a notch portion 34a and a release bar portion 34b whose design is identical to that of the upper latch piece. A helical spring (not shown) mounted on shaft 33 normally maintains the latch piece in abutting relation with an L-shaped stop member 36 whose horizontal leg is secured to the upper surface of carriage 13, the vertical leg of the stop member being inserted in the notch 34a of the latch piece.

Mounted pivotally against side wall 17 by a pin 37 is the rocker arm 11. The upper and lower portions of the rocker arm are interposed between side wall 18 and the side arms of the top and bottom carriages 12 and 13, respectively. The upper and lower portions of the rocker arm are provided with longitudinal slots 11a and 11b through which pass the ends of cross pins 23 and 30, respectively. Thus a rotary motion of rocker arm 11 produces concurrent sliding movement of the carriages 12 and 13 in opposing directions. A force effecting a shift of one carriage in one direction to a given extent effects a simultaneous movement of the other carriage in the other direction to the same extent.

When the two carriages 12 and 13 are in vertical alignment, the longitudinal displacement therebetween is zero, but when either carriage is pushed or drawn in one direction or the other, the relative longitudinal positions of the carriages will vary in accordance with the extent and direction of the movement. For example, should one carriage be shifted a half inch away from the point of vertical alignment, the other carriage will be driven one-half inch from the point in the opposite direction, hence the longitudinal opening therebetween will be one inch. A further one-half inch shift will result in a two inch spacing, and so on.

Surrounding shanks 19b to 22b are compressible springs 38, 39, 40 and 41, each spring being interposed between the interior surface of rear wall 16 and the rear edge of the associated actuator plate. The springs when expanded serve normally to maintain the actuator plates in their retracted position, in which case the associated plungers are fully extended beyond the front wall 15. In this condition the front edges of the actuator plates rest against a cushioning strip 42 secured transversely to the interior surface of front wall 15. When a button is depressed and the actuator plate is locked at its extreme "in" position, the related spring is compressed; and when the plate is released from the latches, the spring returns it to the "out" position.

As shown in Fig. 3 in connection with actuator slide plate 19, the plate is cut out to form two pawl-shaped catch portions 19c and 19d, which project in the direction of the carriages 12 and 13 and are engageable with the upper and lower latches 27 and 34. The upper and lower pawls 19c and 19d are displaced longitudinally from each other by a predetermined distance whereby pawls 19c and 19d will engage the notches 27a and 34a of the latches simultaneously only when the relative longitudinal displacement of the carriages corresponds to that of the pawls. Thus, as shown in Fig. 3, the upper pawl 19c is on a shorter projection than lower pawl 19c as a result of which the carriages 12 and 13 at the point of engagement occupy relative locations depending on the longitudinal spacing between the pawls.

The other actuator plates are similarly provided with top and bottom catch portions or pawls 20c, 20d, 21c, 21d and 22c, 22d. However, the relative displacement between the upper and lower pawls on the other plates is different in each instance, such that simultaneous engagement of the top and bottom pawls with the upper and lower latches will occur at different relative locations of the carriages. For example, in Fig. 5 it will be noted that the upper pawl 20c is projected well in advance of the lower pawl 20d, which is the reverse of the arrangement of plate 19 shown in Fig. 3.

Should the top pawl project forwardly relative to the lower pawl, then the relative displacement is such that to bring about correspondence therewith, the rocker arm 11 which intercouples the carriages 12 and 13 must assume an angular position to the left of the elevational line. But should the bottom pawl project forwardly relative to the top pawl, then at correspondence the rocker arm will be caused to assume an angular position to the right of the elevation line. Of course by variations in the relative longitudinal displacement between pawls in the several actuator plates, the rocker arm may be caused selectively to shift to various angular positions lying in an arc whose axis of rotation is the pivot point 37 of the rocker arm 11.

By coupling a lever 42 extending upwardly from rocker arm 11 and integral therewith to a cable or other coupling means leading to the transmission system, the angular shifts in the rocker arm position may be utilized to control the operation of the system, such that when the lever is shifted to the particular angular position brought about by depressing the neutral button N, the system is similarly shifted, and when the lever is shifted to the other angular positions related to the other push buttons, the system is placed in the appropriate drive range.

The significant aspect of invention resides in the fact that the mechanism acts on the lock-out principle such that an engaged button can be released only when another button is fully depressed to the extent of engagement. It is not possible to press in a second button to release the previously operated button and then to permit the second button to return to the "out" position. To illustrate this important feature, let us assume a situation in which the top and bottom carriages 12 and 13 are in vertical alignment and the several actuator plate pawls are all retracted and disengaged from the latch notches in that no one of actuator plates has upper and lower pawls in vertical alignment. This is a condition which never actually exists in practice but is used to illustrate how the actuator mechanism is first brought into operation, for once any one plate is engaged, its subsequent release can only be effected by the engagement of a second plate.

If now we were to depress the button N attached to plate 19, the plate will move in the direction of the vertically aligned carriages, and the leading edge of the lower pawl 19d, which is longitudinally in advance of the upper pawl 19c, will first strike the release bar of the latch on the bottom carriage 13 to press the latch down and admit the upper pawl into the notch. Continued movement of the actuator plate will cause the lower pawl 19d to drive the bottom carriage 13 toward the rear wall 16, thereby causing the top carriage 12 to slide in the opposite direction to meet the advancing upper pawl 19c.

Thus when the plate 19 is fully depressed, as shown in Fig. 3, the upper and lower pawls 19c and 19d are latched to the top and bottom carriages 12 and 13 and the rocker arm 11 is maintained in an angular position determined by the longitudinal displacement between the pawls.

Once the carriages are in engagement with a given actuator plate, the release of that plate will never be effected until a second plate is brought into engagement. To illustrate this point, let us press a second button, say D as shown in Figs. 4 and 5. It must be remembered that the relative positions of the carriages 12 and 13 at this moment correspond to the pawls on the previously operated button N. Therefore as the second button D is being pressed in, the top pawl 20c of plate 20 which is projected forwardly of the bottom pawl 20d will as shown in Fig. 4, push carriage 12 toward the rear wall and thereby unlatch pawl 19c of the "N" plate 19. However, the lower pawl 19c of the plate 19 is still latched so that it is not released until such time as the lower pawl 20d of the "D" plate 20 strikes the release bar of the lower latch 34 and the lower pawl 20d enters the notch in latch 34 whereby plate 20 is fully engaged, the previously engaged plate 19 is fully released and returned by its spring to the "out" position. Thus, while a partial movement of the second plate effects the unlatching of one of the pawls of the previously operated plate, the release of the first plate is not effected until the second plate is fully depressed and engaged. Fig. 8 illustrates the relative positions of the carriages when "D" plate 20 is engaged and the "N" plate 19 is disengaged. Fig. 9 illustrates the positions of the carriages when the "L" plate 21 is engaged and the "N" plate 19 is disengaged. It will be seen that the rocker arm in Fig. 8 assumes a different angular position than in Fig. 9.

Fig. 6 shows the "L" slide plate 21 as retracted from the carriages and the relative positions of pawls 21c and 21d thereon, while Fig. 7 shows the "R" slide plate 22 and the relative positions of pawls 22c and 22d thereon, plate 22 being retracted. The pawls on these plates are differently positioned so that in engagement the carriages 12 and 13 and hence rocker arm 11 will assume a different angular position upon the depression of plates 21 and 22.

Fig. 10 shows the "R" plate 22 when engaged as compared to the "N" plate 19 when disengaged.

Figs. 11 and 12 illustrate the pivotal movement of the upper and lower latches 27 and 34 as a pawl enters into engagement therewith. As indicated in Fig. 11, when the upper pawl 22c on the "R" plate 22 strikes the release bar 27b on latch 27, it forces it down, and as the "R" plate continues to advance and pushes carriage 12, the pawl 19c of the previously engaged "N" plate 19 is withdrawn from the notch 27a of the latch and the pawl 22c enters the notch. The lower latch 34 is similarly actuated by the arriving pawl 22d except that the latch is raised by the leading edge of the pawl 22d to release the previously engaged pawl 19d.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

I claim:

1. A selective actuating mechanism comprising a positionable member for controlling the operation of a device coupled thereto, said member including a rocker arm and first and second carriages pivotally connected to opposite ends of said arm and slidable in parallel planes whereby the angular position of said arm is determined by the relative longitudinal locations of said carriages, a plurality of actuating elements supported for movement independently of each other toward said positionable member from an inoperative point to an operative point, each element having first and second projections directed toward said first and second carriages respectively and engageable therewith, the projections on said elements having a predetermined longitudinal displacement which is different for each element whereby at the operative point of a given element said carriages are caused to assume corresponding relative locations and said rocker arm is caused to assume an angular position in accordance therewith, said carriages including means releasably to engage said projections to maintain said given element at said operative position thereby to indicate the status of the actuating mechanism.

2. A selective actuating mechanism comprising a positionable member for controlling the operation of a device coupled thereto, said member including a pivotally mounted rocker arm and first and second carriages pivotally connected to opposite ends of said arm and slidable in parallel planes whereby the angular position of said arm is determined by the relative longitudinal locations of said carriages, a plurality of push-button operated actuating elements supported for movement independently of each other toward said positionable member from an inoperative point to an operative point, each element having first and second projections directed toward said first and second carriages respectively and engageable therewith, the projections on said elements having a predetermined longitudinal displacement which is different for each element whereby at the operative point of a given element said carriages are caused to assume corresponding relative locations and said rocker arm is caused to assume an angular position in accordance therewith, said carriages each including latch means to releasably engage said projections, said latch means being releasable only when the projection of a second element enters into engagement with said carriage.

3. A selective actuating mechanism comprising a positionable member for controlling the operation of a device coupled thereto, said member including a rocker arm and first and second carriages pivotally connected to opposite ends of said arm and slidable in parallel planes whereby the angular position of said arm is determined by the relative longitudinal location of said carriages, a plurality of actuating elements supported for movement independently of each other toward said positionable member from an inoperative point to an operative point, each element having first and second catch portions projecting in the direction of said carriages and engageable therewith, said catch portions of said elements having a predetermined longitudinal displacement which is different for each element whereby at the operative point of a given element said carriages are compelled to assume relative locations and said rocker arm is caused to assume an angular position in accordance with said displacement, and first and second releasable latch means supported on said first and second carriages respectively to lock said catch portions thereto.

4. A selective actuating mechanism comprising a positionable member for controlling the operation of a device coupled thereto, said member including a rocker arm and first and second carriages pivotally connected to opposite ends of said arm and slidable in parallel planes whereby the angular position of said arm is determined by the relative longitudinal location of said carriages, a plurality of actuating elements supported for straight line movement independently of each other toward said positionable member from an inoperative point to an operative point each of said elements having a plunger portion to which is attached a push button for operating said element, spring means normally to maintain each element in its inoperative position, each element having first and second catch portions projecting in the direction of said carriages and engageable therewith, said catch portions of said elements having a predetermined longitudinal displacement which is different for each element whereby at the operative point of a given element said carriages are caused to assume relative locations and said rocker arm is caused to assume an angular position in accordance with said displacement, and first and second releasable latch means supported on said first and second carriages respectively to lock said catch portions thereto.

5. A mechanism as set forth in claim 4, wherein each catch portion is provided with a pawl and said latch means is constituted by a spring biased and pivotally mounted bar having a groove therein to receive said pawl.

6. A selective actuating mechanism comprising a box-like frame, positionable member for controlling the operation of a device coupled thereto, said member including a rocker arm pivotally mounted against one side of said frame and first and second carriages pivotally connected to opposite ends of said arm and slidable in parallel planes perpendicular to the sides of said frame whereby the angular position of said arm is determined by the relative longitudinal location of said carriages, a plurality of actuating plates supported within said frame at positions parallel to the sides thereof for movement independently of each other toward said positionable member from an inoperative point to an operative point, each plate having a plunger portion extending through the front wall of said frame and attached to a push button, each plate having first and second catch portions projecting in the direction of said carriages and engageable therewith, said catch portions of said plates having a predetermined longitudinal displacement which is different for each plate whereby at the operative point of a given plate said carriages are caused to assume relative locations and said rocker arm is caused to assume an angular position in accordance with said displacement, and first and second releasable latch means supported on said first and second carriages respectively to lock said catch portions thereto.

7. A selective actuating mechanism comprising a box-like frame positionable member for controlling the operation of a device coupled thereto, said member including a rocker arm pivotally mounted against one side of said frame, and first and second carriages pivotally connected to opposite ends of said arm and slidable in parallel planes perpendicular to the sides of said frame whereby the angular position of said arm is determined by the relative longitudinal location of said carriages, a plurality of actuating plates supported within said frame at positions parallel to the sides thereof for movement independently of each other toward said positionable member from an inoperative point to an operative point, each plate having first and second pawl portions projecting in the direction of said carriages and engageable therewith, said pawl portions of said plates having a predetermined longitudinal displacement which is different for each plate whereby at the operative point of a given plate said carriages are caused to assume relative locations and said rocker arm is caused to asssume an angular position in accordance with said displacement, and first and second releasable latch means supported on said first and second carriages respectively to lock said catch portions thereto, said latch means being constituted by a spring biased and pivotally mounted bar having a groove therein to receive said pawl.

References Cited in the file of this patent
UNITED STATES PATENTS

| 2,335,812 | Steffens | Nov. 30, 1943 |
| 2,388,581 | Soffietti | Nov. 6, 1945 |
| 2,533,477 | Laschenski | Dec. 12, 1950 |